E. BOCKSHE.
GEAR CASING FOR TOOL GRINDERS.
APPLICATION FILED APR. 29, 1918.
1,298,652.
Patented Apr. 1, 1919.
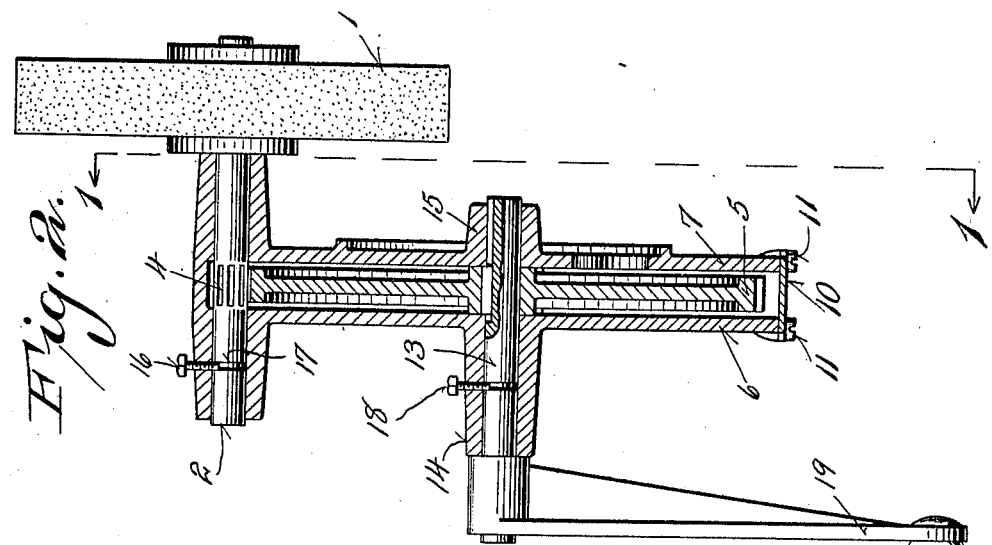
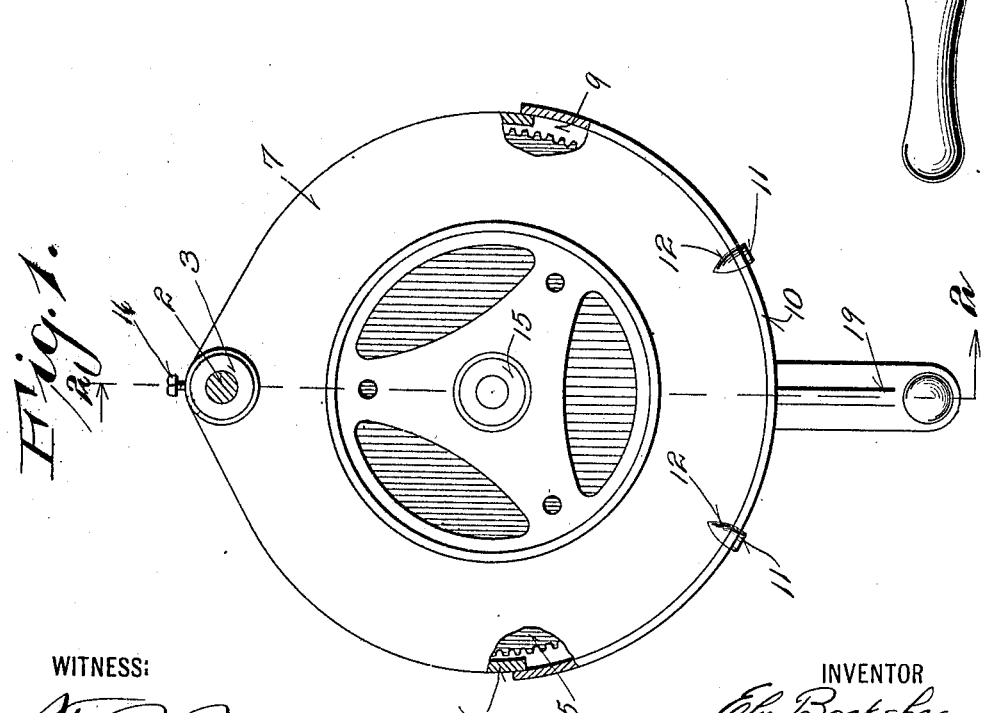
WITNESS:
J. F. Britt
INVENTOR
Ely Bockshe
BY
ATTORNEY

UNITED STATES PATENT OFFICE.

ELY BOCKSHE, OF MILWAUKEE, WISCONSIN, ASSIGNOR TO MODERN GRINDER MANUFACTURING CO., OF MILWAUKEE, WISCONSIN.

GEAR-CASING FOR TOOL-GRINDERS.

1,298,652.     Specification of Letters Patent.     Patented Apr. 1, 1919.

Application filed April 29, 1918. Serial No. 231,365.

*To all whom it may concern:*

Be it known that I, ELY BOCKSHE, a citizen of the United States, and resident of Milwaukee, in the county of Milwaukee and State of Wisconsin, have invented certain new and useful Improvements in Gear-Casings for Tool-Grinders; and I do hereby declare that the following is a full, clear, and exact description thereof.

My invention relates to new and useful improvements in tool grinders, buffers and the like, and has for its principal object the provision of a simply constructed one-piece cast housing for inclosing the operating gears and supporting the axles or spindles thereof.

Hereinbefore it has been customary to construct such a casing in two separable sections held together by nuts and bolts or other fastening elements, and in such case the bearings which support the spindle of the buffer or grinder and the axle of the main driving gear are in two parts, one being carried by each section.

The alining of the parts of the bearings therefore depends upon the accuracy with which the sections are secured together. When the sections and parts of the bearings are cast integrally this objection is entirely eliminated.

The invention resides in the novel features of construction which will be hereinafter more particularly described and claimed and shown in the drawing in which:

Figure 1 represents a vertical sectional view on the plane of the line 1—1 of Fig. 2, and Fig. 2 is a vertical transverse sectional view on the line 2—2 of Fig. 1.

Referring more particularly to the drawing in which I have illustrated my invention as applied to a tool grinder, it will be seen that the abrading wheel 1 is fixed to one end of a spindle 2, the latter being substantially the same diameter throughout its length to readily slide into the bore of an elongated two-part bearing 3. Intermediate the ends of the spindle the same is milled to provide an annular series of longitudinally extending grooves which form teeth 4 for the engagement with the teeth of a main driving spur gear 5.

Said gear 5 is disposed in a gear case formed by a pair of circular plates 6 and 7 whose diameters are slightly greater than that of said gear, and which are integrally connected at their edges by an arcuate wall 8. From the drawing it will be noted that said wall 8 connects substantially the upper half of the edges of the plates, thus leaving the lower portion of the gear case open as at 9 to permit the insertion of the gear 5; the opening is ordinarily closed by an arcuate cover 10 secured in place by bolts 11 threaded into apertured bosses 12 on the plates 6 and 7.

The two-part elongated bearing 3 hereinbefore referred to is located at the top of the gear case formed by the plates 6 and 7 and the wall 8 and is formed integrally with the latter, one part of the bearing being projected laterally from each plate 6 and 7. Thus the axis of the bearing 3 extends at right angles to a longitudinal plane of the gear case.

The gear 5 after being inserted into the gear case through the opening 9 thereof is keyed upon an axle 13 which extends through its hub, the opposite ends of said axle being journaled in alined bearing sleeves 14 and 15 formed integrally with the plates 6 and 7 respectively substantially centrally thereof. Said bearing sleeves are alined and their axis is positioned parallel to the axis of the bearing 3 and extended in the same direction. Inasmuch as the gear case and the journal bearings carried thereby are all cast or otherwise formed as one unit, there is no possibility of the parts of said bearings becoming disalined.

The spindle 2 is held against longitudinal movement in its bearing 3 by the engagement of a retaining bolt 16 in an annular groove 17 cut therein. The axle 13 is similarly retained in the bearings 14 and 15 by a retaining bolt 18. The crank handle 19 is connected to one end of the axle 13 so that the gear 15 may be readily revolved and rotative movement thereby applied to the wheel 1.

I claim:

1. A one-piece gear case comprising a pair of plates, a peripheral wall formed integrally with the edges of said plates, said wall having an opening at one side, a journal bearing formed integrally with and centrally of each plate, said bearings being alined to receive and support the end portions of a gear axle, and a spindle bearing formed integrally with each plate at the periphery thereof and with the adjacent portion of the peripheral wall, said spindle bearing being disposed parallel to the axis of the alined journal bearings.

2. A device of the class described comprising a one-piece gear case formed of a pair of spaced plates, a peripheral wall formed integrally with the edges of said plates, said wall having an opening at one side, a journal bearing formed integrally with and centrally of each plate, said bearings being alined, a spindle bearing formed integrally with each plate at the periphery thereof and with the adjacent portion of the peripheral wall, said spindle bearing being disposed parallel to the axis of the alined journal bearings and at right angles to a longitudinal plane of the gear case, a gear disposed between said plates through said opening in the peripheral wall, an axle mounted in the journal bearings and having the gear secured thereto, a spindle journaled in the spindle bearing and engaged with the gear to be rotated thereby, and means connected with the axle for rotating the same.

In testimony that I claim the foregoing I have hereunto set my hand at Milwaukee, in the county of Milwaukee and State of Wisconsin.

ELY BOCKSHE.

Copies of this patent may be obtained for five cents each, by addressing the "Commissioner of Patents, Washington, D. C."